(12) United States Patent  (10) Patent No.: US 8,297,649 B2
Enders  (45) Date of Patent: Oct. 30, 2012

(54) INFLATABLE KNEE AIRBAG HAVING TWO CHAMBERS SEPARATED BY AN INTERNAL TETHER

(75) Inventor: Mark L. Enders, Pleasant View, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 12/504,544

(22) Filed: Jul. 16, 2009

(65) Prior Publication Data

US 2011/0012327 A1  Jan. 20, 2011

(51) Int. Cl.
*B60R 21/233* (2006.01)
(52) U.S. Cl. .................. 280/730.1; 280/729; 280/743.2
(58) Field of Classification Search .............. 280/730.1, 280/729, 743.2, 743.1, 730.2
See application file for complete search history.

(56) References Cited

U.S. PATENT DOCUMENTS

| | | | |
|---|---|---|---|
| 3,858,822 A | 1/1975 | Wood | |
| 3,904,222 A | 9/1975 | Bursott et al. | |
| 3,966,227 A | 6/1976 | Cameron | |
| 4,290,627 A | 9/1981 | Cumming et al. | |
| 5,338,061 A * | 8/1994 | Nelson et al. | 280/729 |
| 5,344,184 A | 9/1994 | Keeler et al. | |
| 5,427,410 A * | 6/1995 | Shiota et al. | 280/743.1 |
| 5,460,400 A | 10/1995 | Davidson | |
| 5,529,337 A * | 6/1996 | Takeda et al. | 280/729 |
| 5,669,627 A | 9/1997 | Marjanski et al. | |
| 5,690,354 A | 11/1997 | Logan et al. | |
| 5,765,867 A | 6/1998 | French | |
| 5,772,239 A | 6/1998 | Seymour | |
| 5,803,487 A | 9/1998 | Kikuchi et al. | |
| 5,810,390 A | 9/1998 | Enders et al. | |
| 5,823,566 A | 10/1998 | Manire | |
| 5,845,935 A * | 12/1998 | Enders et al. | 280/743.2 |
| 5,927,748 A * | 7/1999 | O'Driscoll | 280/729 |
| 6,010,147 A | 1/2000 | Brown | |
| 6,059,312 A * | 5/2000 | Staub et al. | 280/729 |

(Continued)

FOREIGN PATENT DOCUMENTS

DE 20 2006 014 012 8/2006

(Continued)

OTHER PUBLICATIONS

U.S. Appl. No. 12/872,323, filed Aug. 31, 2010, Covers for Inflatable Knee Airbag Housings.

(Continued)

*Primary Examiner* — Ruth Ilan
*Assistant Examiner* — Keith Frisby
(74) *Attorney, Agent, or Firm* — Sally J. Brown; Stoel Rives LLP

(57) ABSTRACT

Inflatable airbag cushions can be formed with one or more inflatable chambers, each having different inflated widths and volumes. For example, an inflatable knee airbag can have a first chamber that is adjacent to the periphery of the airbag and a second chamber that is nested within the first chamber. The two chambers can be fluidly coupled and the second chamber may have a vent formed in it that can release inflation gas out of the airbag. The airbag may have more than one nested chamber. The nested chambers can be defined by one or more internal tethers that can be formed from one or more pieces of material. The airbag can be configured such that it and any internal tethers are produced from a single panel of material.

19 Claims, 11 Drawing Sheets

U.S. PATENT DOCUMENTS

| | | | |
|---|---|---|---|
| 6,135,495 | A | 10/2000 | Redgrave et al. |
| 6,155,595 | A * | 12/2000 | Schultz ................. 280/729 |
| 6,213,496 | B1 * | 4/2001 | Minami et al. ............ 280/729 |
| 6,217,059 | B1 | 4/2001 | Brown et al. |
| 6,224,129 | B1 | 5/2001 | Cisternino et al. |
| 6,254,121 | B1 * | 7/2001 | Fowler et al. ............ 280/729 |
| 6,299,205 | B1 | 10/2001 | Keshavaraj |
| 6,364,348 | B1 | 4/2002 | Jang et al. |
| 6,431,583 | B1 | 8/2002 | Schneider |
| 6,454,296 | B1 | 9/2002 | Tesch et al. |
| 6,464,255 | B1 | 10/2002 | Preisler et al. |
| 6,474,686 | B1 | 11/2002 | Higuchi et al. |
| 6,494,484 | B2 | 12/2002 | Bosgieter et al. |
| 6,588,793 | B2 | 7/2003 | Rose |
| 6,631,920 | B1 | 10/2003 | Webber et al. |
| 6,655,711 | B1 | 12/2003 | Labrie et al. |
| 6,682,093 | B2 | 1/2004 | Tajima et al. |
| 6,685,217 | B2 | 2/2004 | Abe |
| 6,715,789 | B2 | 4/2004 | Mizuno et al. |
| 6,752,417 | B2 | 6/2004 | Takimoto et al. |
| 6,846,005 | B2 | 1/2005 | Ford et al. |
| 6,913,280 | B2 | 7/2005 | Dominissini et al. |
| 6,945,557 | B2 | 9/2005 | Takimoto et al. |
| 6,959,944 | B2 | 11/2005 | Mori et al. |
| 6,962,363 | B2 | 11/2005 | Wang et al. |
| 6,962,366 | B2 | 11/2005 | Fukuda et al. |
| 7,000,945 | B2 | 2/2006 | Bakhsh et al. |
| 7,000,947 | B2 | 2/2006 | Kumagai et al. |
| 7,029,026 | B2 | 4/2006 | Morita |
| 7,055,851 | B2 | 6/2006 | Takimoto et al. |
| 7,131,664 | B1 | 11/2006 | Pang et al. |
| 7,147,247 | B2 | 12/2006 | Hayakawa |
| 7,156,418 | B2 | 1/2007 | Sato et al. |
| 7,175,195 | B2 | 2/2007 | Morita |
| 7,182,365 | B2 | 2/2007 | Takimoto et al. |
| 7,185,912 | B2 | 3/2007 | Matsuura et al. |
| 7,195,275 | B2 | 3/2007 | Abe |
| 7,195,280 | B2 | 3/2007 | Wheelwright et al. |
| 7,201,396 | B2 | 4/2007 | Takimoto et al. |
| 7,226,077 | B2 | 6/2007 | Abe |
| 7,232,149 | B2 | 6/2007 | Hotta et al. |
| 7,261,318 | B2 | 8/2007 | Enders |
| 7,281,734 | B2 | 10/2007 | Abe et al. |
| 7,314,228 | B2 | 1/2008 | Ishiguro et al. |
| 7,314,230 | B2 | 1/2008 | Kumagai et al. |
| 7,347,444 | B2 | 3/2008 | Wheelwright |
| 7,370,881 | B2 | 5/2008 | Takimoto et al. |
| 7,374,201 | B2 | 5/2008 | Chausset |
| 7,374,202 | B2 | 5/2008 | Lim |
| 7,380,813 | B2 | 6/2008 | Lanzinger et al. |
| 7,384,065 | B2 | 6/2008 | Takimoto et al. |
| 7,387,311 | B2 | 6/2008 | Kanno et al. |
| 7,396,044 | B2 | 7/2008 | Bauer et al. |
| 7,434,837 | B2 | 10/2008 | Hotta et al. |
| 7,438,310 | B2 | 10/2008 | Takimoto et al. |
| 7,549,672 | B2 | 6/2009 | Sato et al. |
| 7,566,074 | B2 | 7/2009 | Hawthorn et al. |
| 7,568,724 | B2 | 8/2009 | Kutchey et al. |
| 7,568,730 | B2 | 8/2009 | Kwon |
| 7,631,894 | B2 | 12/2009 | Hasebe et al. |
| 7,641,223 | B2 | 1/2010 | Knowlden |
| 7,658,408 | B2 | 2/2010 | Zofchak et al. |
| 7,658,409 | B2 | 2/2010 | Ford et al. |
| 7,695,013 | B2 | 4/2010 | Kakstis et al. |
| 7,712,769 | B2 | 5/2010 | Hasebe et al. |
| 7,717,460 | B2 * | 5/2010 | Franke et al. ............ 280/743.1 |
| 7,744,118 | B2 | 6/2010 | Takimoto et al. |
| 7,748,739 | B2 | 7/2010 | Brinker |
| 7,753,405 | B2 | 7/2010 | Ishiguro et al. |
| 7,753,407 | B2 | 7/2010 | Yokota |
| 7,766,374 | B2 | 8/2010 | Abele et al. |
| 7,793,973 | B2 * | 9/2010 | Sato et al. .................. 280/730.2 |
| 7,798,517 | B2 | 9/2010 | Ishida |
| 7,819,419 | B2 * | 10/2010 | Hayashi et al. ........... 280/730.1 |
| 7,878,540 | B2 | 2/2011 | Takimoto et al. |
| 8,083,254 | B2 | 12/2011 | Enders et al. |
| 8,118,325 | B2 | 2/2012 | Enders et al. |
| 2001/0007391 | A1 | 7/2001 | Hamada et al. |
| 2002/0044819 | A1 | 4/2002 | Shamoon |
| 2002/0149187 | A1 * | 10/2002 | Holtz et al. ................. 280/749 |
| 2002/0171231 | A1 | 11/2002 | Takimoto et al. |
| 2002/0180187 | A1 | 12/2002 | Hayashi |
| 2003/0034637 | A1 * | 2/2003 | Wang et al. ................. 280/729 |
| 2003/0209888 | A1 | 11/2003 | Davis, Jr. et al. |
| 2005/0001412 | A1 | 1/2005 | Schneider et al. |
| 2005/0057028 | A1 * | 3/2005 | Hayakawa .................. 280/740 |
| 2005/0062265 | A1 * | 3/2005 | Hotta et al. ................. 280/730.1 |
| 2005/0151351 | A1 | 7/2005 | Enders et al. |
| 2005/0194767 | A1 | 9/2005 | Freisler et al. |
| 2005/0194771 | A1 | 9/2005 | Clark et al. |
| 2005/0212275 | A1 | 9/2005 | Hasebe |
| 2005/0230939 | A1 | 10/2005 | Abe et al. |
| 2006/0279073 | A1 | 12/2006 | Hotta et al. |
| 2007/0057487 | A1 | 3/2007 | Kim |
| 2007/0120346 | A1 | 5/2007 | Kwon |
| 2007/0200321 | A1 * | 8/2007 | Heitplatz et al. ........... 280/730.1 |
| 2007/0246920 | A1 | 10/2007 | Abele et al. |
| 2008/0157509 | A1 | 7/2008 | Abe et al. |
| 2008/0217892 | A1 | 9/2008 | Maripudi et al. |
| 2008/0238048 | A1 | 10/2008 | Ishida |
| 2009/0045607 | A1 | 2/2009 | Fukuyama et al. |
| 2009/0058048 | A1 | 3/2009 | Ishida et al. |
| 2009/0058052 | A1 | 3/2009 | Ford et al. |
| 2009/0085333 | A1 * | 4/2009 | Imaeda et al. ............. 280/730.1 |
| 2009/0134611 | A1 | 5/2009 | Wigger et al. |
| 2009/0146400 | A1 | 6/2009 | Knowlden |
| 2009/0152842 | A1 | 6/2009 | Benny et al. |
| 2009/0152847 | A1 | 6/2009 | Hong et al. |
| 2009/0184498 | A1 | 7/2009 | Takimoto et al. |
| 2009/0212541 | A1 | 8/2009 | Wallat et al. |
| 2009/0242308 | A1 | 10/2009 | Kitte et al. |
| 2010/0025973 | A1 | 2/2010 | Jang et al. |
| 2010/0090445 | A1 | 4/2010 | Williams et al. |
| 2010/0270775 | A1 | 10/2010 | Enders et al. |
| 2010/0270779 | A1 | 10/2010 | Enders et al. |
| 2010/0270782 | A1 | 10/2010 | Enders et al. |
| 2011/0012327 | A1 | 1/2011 | Enders |
| 2011/0101660 | A1 | 5/2011 | Schneider et al. |
| 2011/0148077 | A1 | 6/2011 | Enders |
| 2012/0025496 | A1 | 2/2012 | Schneider et al. |
| 2012/0049488 | A1 | 3/2012 | Enders |
| 2012/0049497 | A1 | 3/2012 | Enders |

FOREIGN PATENT DOCUMENTS

| | | |
|---|---|---|
| DE | 10 2008 029810 | 12/2009 |
| WO | WO 02/004262 | 1/2002 |
| WO | WO 2010/126623 | 11/2010 |
| WO | WO-2011/008916 | 1/2011 |
| WO | WO-2011/056810 | 5/2011 |
| WO | WO-2011/079178 | 6/2011 |
| WO | WO-2012/030482 | 3/2012 |

OTHER PUBLICATIONS

U.S. Appl. No. 12/872,946, filed Aug. 31, 2010, Inflatable Knee Airbag Assemblies With Articulating Housings.

Co-pending U.S. Appl. No. 13/270,462, titled Knee Airbag Assemblies and Related Methods, filed Oct. 11, 2011.

Co-pending U.S. Appl. No. 13/290,856, titled Knee Airbag Folding Patterns and Assemblies and Related Methods, filed Nov. 7, 2011.

* cited by examiner

INFLATABLE KNEE AIRBAG HAVING TWO CHAMBERS SEPARATED BY AN INTERNAL TETHER

TECHNICAL FIELD

The present disclosure relates generally to the field of automotive protective systems. More specifically, the present disclosure relates to inflatable knee airbag cushion assemblies.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the disclosure's scope, the embodiments will be described and explained with specificity and detail in reference to the accompanying drawings.

DETAILED DESCRIPTION OF PREFERRED EMBODIMENTS

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to roof rail of the vehicle, in an overhead position, or at the knee or leg position. In the following disclosure, "airbag" may refer to a knee airbag, an inflatable curtain airbag, overhead airbag, front airbag, or any other airbag type.

Inflatable knee airbags are typically installed in a lower portion of the steering column, instrument panel, under a glove box, and/or under a seat of a vehicle. During installation, the airbags are rolled, folded, or both, and are retained in the packaged state behind a cover. During a collision event, vehicle sensors trigger the activation of an inflator, which rapidly fills the airbag with inflation gas. Thus the airbag rapidly changes configurations from the packaged configuration to an expanded, extended, and deployed configuration.

Figure 1:
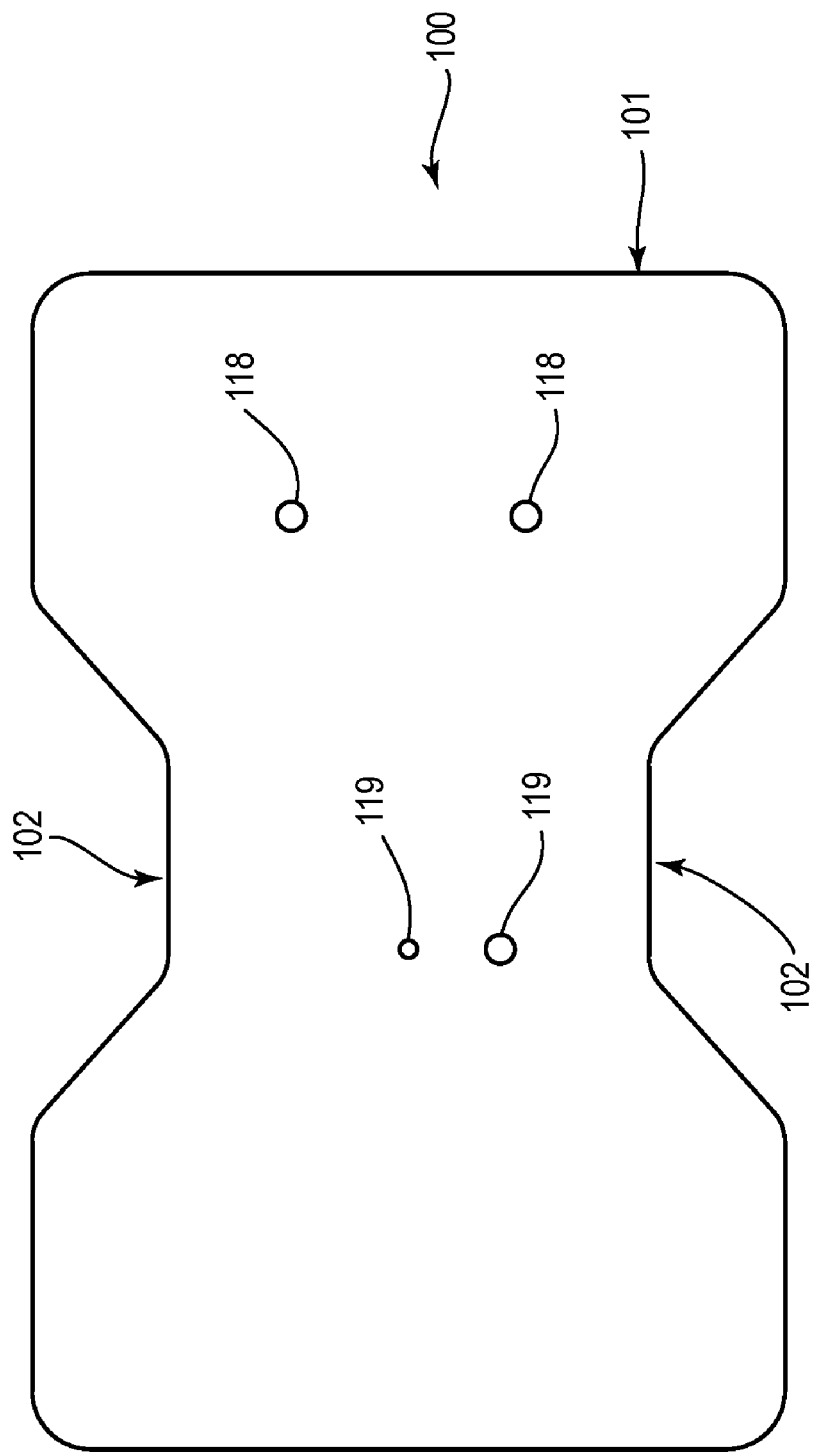
FIG. 1 is a top elevation view of a panel of material from which a portion of an airbag cushion may be formed, which in turn, comprises a portion of an airbag assembly.

FIG. 1 is a top elevation view of a panel of material 101 from which a portion of an airbag cushion may be formed. Panel 101 comprises a sheet of fabric that may comprise a woven nylon material, or any other material that is well known in the art. Panel 101 may comprise a substantially rectangular shape or may also be said to have an "I" or "H" shape. A middle portion 102 may have a reduced width compared to the end portions. Before being formed into an "I" or "H" shape, panel of material 101 may comprise a rectangular piece of material from which portions may be cut to yield the reduced width of middle portion 102. The pieces removed from panel 101 may be used to form an internal tether that may be employed within an inflatable airbag cushion. Various apertures may be formed in panel of material 101 before or after the panel is configured as an inflatable knee airbag. In the depicted embodiment, the panel has two apertures 118 that will comprise atmospheric vents when panel of material 101 is configured as an inflatable knee airbag and two apertures 119 that will comprise inflator apertures.

Figure 2:
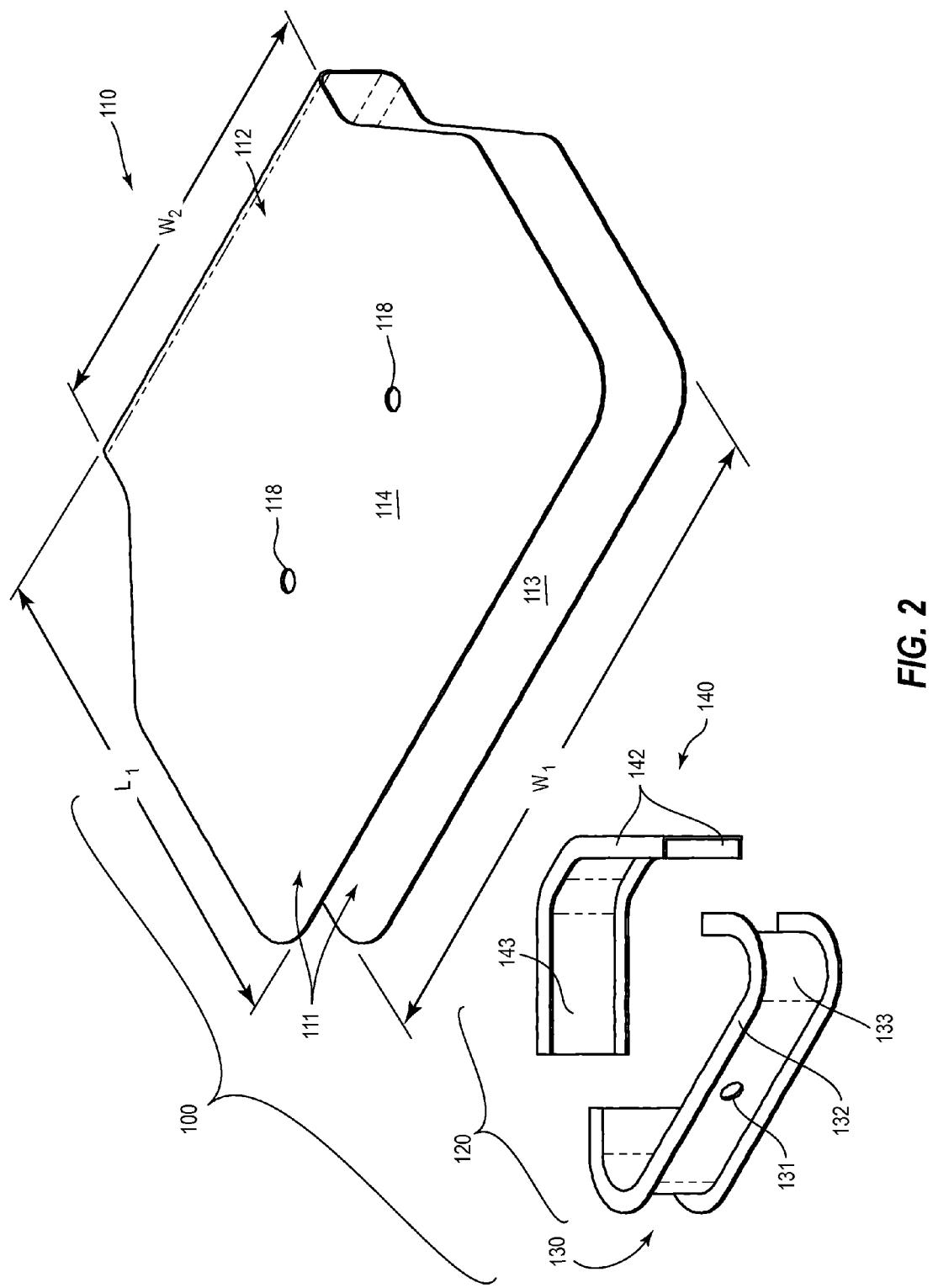
FIG. 2 is an exploded perspective view of a portion of an airbag assembly, wherein the panel of material of FIG. 1 has been folded into the configuration of an inflatable knee airbag.

FIG. 2 is an exploded bottom perspective view depicting panel 101 after first and second tether portions 130 and 140 have been cut from the panel to form reduced width middle portion 102 and after the panel has been folded such that it is in a configuration that can form an inflatable knee airbag 110. Inflatable knee airbag 110 may comprise an upper portion 111, a lower portion 112, a first face 113, a second face 114, and atmospheric vents 118.

Upper portion 111 of inflatable knee airbag 110 is the portion of the airbag that is closest to the headliner of a vehicle when the airbag is in a deployed state. Lower portion 112 is below upper portion 111 when inflatable knee airbag 110 is in a deployed state, and is closest to a floor of the vehicle. Also, lower portion 112 may comprise the portion of inflatable knee airbag 110 that is coupled to an inflator and/or airbag housing. The term "lower portion" is not necessarily limited to the portion of inflatable knee airbag 110 that is below a horizontal medial plane of the inflatable knee airbag, but may include less than half, more than half or exactly half of the bottom portion of the inflatable knee airbag. Likewise, the term "upper portion" is not necessarily limited to the portion of inflatable knee airbag 110 that is above a horizontal medial plane of the airbag, but may include less than half, more than half or exactly half of the top portion of the airbag.

First face 113 may comprise the face of inflatable knee airbag 110 that is closest to an occupant, which airbag 110 is intended to cushion. Second face 114 is opposite front face 113, and may comprise the face of inflatable knee airbag 110 that is furthest from an occupant, which airbag 110 is intended to cushion. Atmospheric vents 118 are located at predetermined locations on inflatable knee airbag 110.

A length and/or width of knee airbag 110 may be varied according to different embodiments. For example, width $W_1$ may be from about 400 mm to about 900 mm; length $L_1$ may be from about 300 mm to about 700 mm; and $W_2$ may be from about 200 mm to about 600 mm. Width $W_2$ of middle portion 102 may comprise from about 50% to about 80% of the width $W_1$ of inflatable knee airbag 110. By way of example, and not of limitation, in one embodiment, $W_1$ is 680 mm, $L_1$ is 503.5 mm, and $W_2$ is 430 mm.

Figure 8:
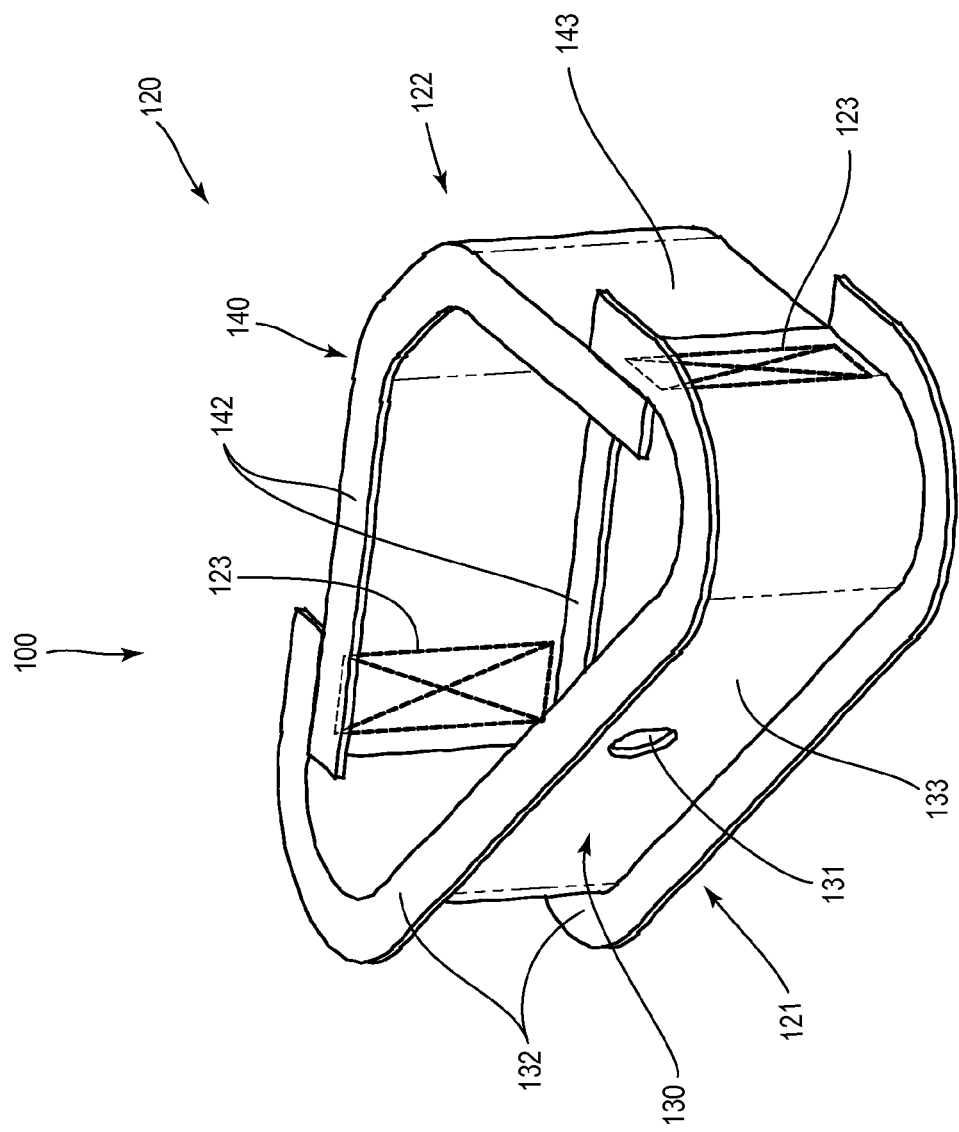
FIG. 8 is a perspective view of the internal tether of the inflatable knee airbag assembly of FIG. 3 after the tether has been assembled.

An internal tether, 120 may be formed from a first tether portion 130 and a second tether portion 140, each of which may be cut from panel of material 101, depicted in FIG. 1 herein. As such, first and second tether portions 130 and 140 may comprise a woven nylon material or any other suitable material known in the art. First and second tether portions 130 and 140 are configured to be coupled together to form internal tether 120. First tether portion 130 may comprise a chamber-to-chamber vent aperture 131, a flange 132, and a body portion 133. Second tether portion 140 may comprise a flange portion 142 and a body portion 143. Flanges 132 and 142 may be formed by folding opposing longitudinal edges of body portions 133 and 143. One skilled in the art will recognize that because first and second tether portions 130 and 140 comprise non-rigid pieces of fabric, before the tether portions are coupled together and coupled to a inflatable knee airbag, the tether portions may not comprise the shapes as depicted in FIG. 2 and FIG. 8. Likewise, before being coupled to an inflatable knee airbag, first and second tether portions 130 and 140 may not comprise flange portions 132 and 142.

Figure 3:
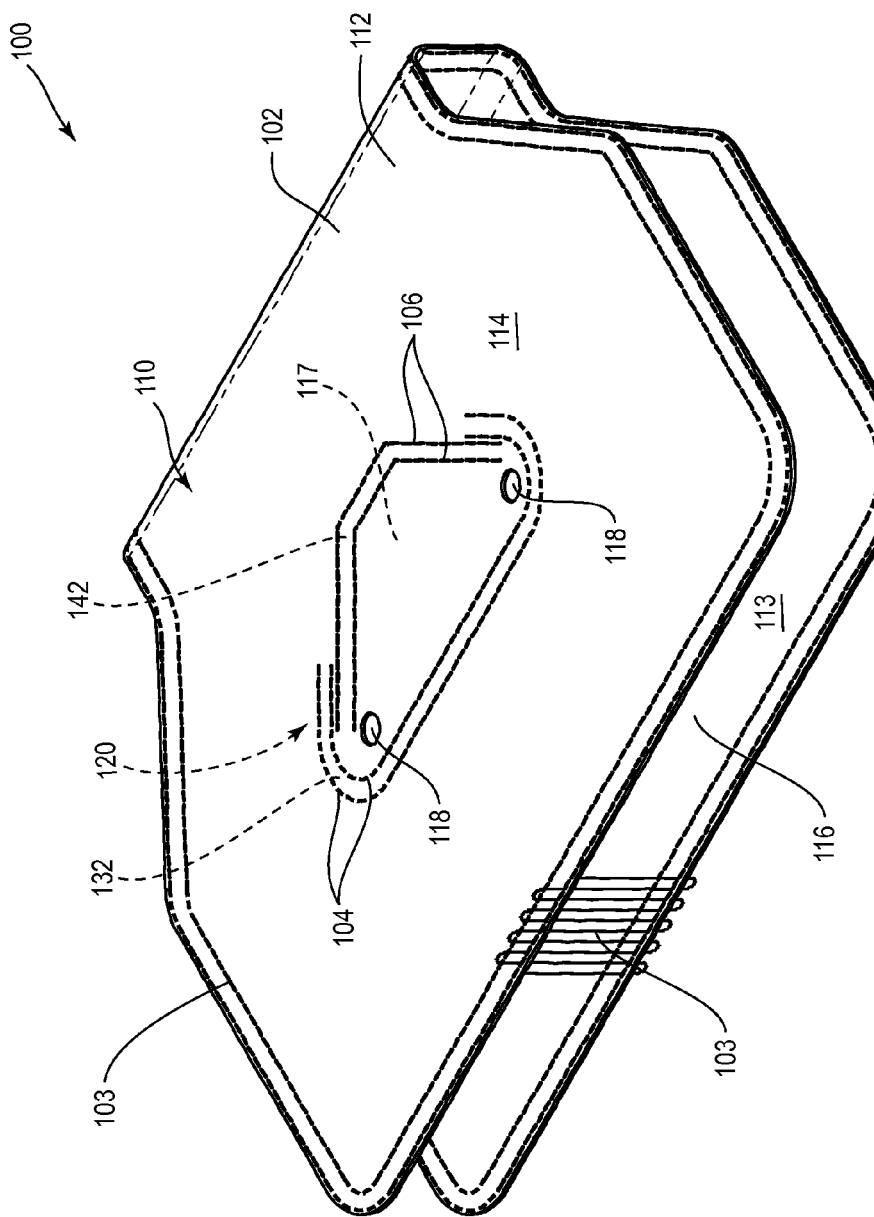
FIG. 3 is a perspective view of the inflatable knee airbag components of FIG. 2 after the components have been assembled.

FIG. 3 is a bottom perspective view of a portion of airbag assembly 100, wherein first and second tether portions 130 and 140 have been coupled to inflatable knee airbag 110 and a perimeter seam 103 has been formed by stitching. After the first and second tether portions 130 and 140 have been cut from panel of material 101, the panel may be folded at middle portion 102 to form a fold. When panel 101 is folded, first face 113 and second face 114 are brought in close proximity such that the planes of the first and second faces are in a substantially parallel orientation. In this configuration, middle portion 102 may be said to comprise a fold, a folded middle portion, or a folded lower portion 112. Folded lower portion 112 may comprise one or more discrete folds, or the fold may comprise a more general "U" shape.

Once membrane 101 is folded, a perimeter seam 103 may be formed via stitching such that the first and second faces 113 and 114 are coupled together. Perimeter seam 103 may be configured such that it is airtight, or such that the seam is not airtight. For clarity in depicting various structures and characteristics of assembly 100, in FIGS. 3-5, cushion 110 is shown without the perimeter being sewn together such that first and second faces 113 and 114 are touching. Prior to perimeter seam 103 being sewn, internal tether 120 may be inserted between the first and second faces 113 and 114 and coupled to inflatable knee airbag 110 via flanges 132 and 142. Stitching 104 and 106 may be employed to attach flanges 132 and 142 to first and second faces 113 and 114. Stitching 104 and 106 may comprise the same type of stitching, and in some embodiments, one contiguous seam of stitching may be employed to attach internal tether 120 to airbag 110. After being folded and stitched together along the perimeter, it may be said that panel of material 101 of FIG. 1 has been configured as an inflatable knee airbag 110.

After internal tether 120 has been integrated within airbag 110 and perimeter seam 103 has closed the airbag, the airbag can be said to comprise a first inflatable chamber 116 and a second inflatable chamber 117. First inflatable chamber 116 is partially defined by perimeter seam 103, tether 120 and portions of first and second faces 113 and 114 that are located outside tether 120. Second inflatable chamber 117 is partially defined by tether 120 and portions of first and second faces 113 and 114 that are located inside tether 120. Atmospheric vents 118 may be formed in second face 114 of inflatable knee airbag 110 such that inflation gas may be vented out of inflatable chambers 116 and 117. During deployment, airbag 110 is configured such that second face 114 is oriented away from an occupant; therefore, atmospheric vents 118 are on an opposite side of the airbag from an occupant.

As will be appreciated by those skilled in the art, a variety of types and configurations of airbag cushion membranes can be utilized without departing from the scope and spirit of the present disclosure. For example, the size, shape, and proportions of the cushion membrane may vary according to its use in different vehicles or different locations within a vehicle. Also, the cushion membrane may comprise one or more pieces of any material well known in the art, such as a woven nylon fabric. Additionally, the airbag cushion may be manufactured using a variety of techniques such as one piece weaving, "cut and sew", or a combination of the two techniques. Further, the cushion membrane may be manufactured using sealed or unsealed seams, wherein the seams are formed by stitching, adhesive, taping, radio frequency welding, heat sealing, or any other suitable technique or combination of techniques.

One skilled in the art will also recognize that a variety of types, number, and configurations of second chambers can be employed without departing from the sprit of the present disclosure. For example, more than one internal inflatable chamber may be formed within the first inflatable chamber. The first inflatable chamber may also be called a "larger" chamber or an "outer" chamber. The term "outer" may not imply that the chamber is separate from the inner chamber on all sides and faces. The second inflatable chamber may be said to be a "nested" chamber, an "embedded" chamber, or a chamber that is "surrounded" by another chamber. The term "surrounded" may not imply that the nested chamber is completely encompassed within the outer chamber; as described herein, the nested chamber may share one or more sides, panels of material, or faces with the outer chamber. Further the inflatable airbag may comprise more than two chambers. For example, in one such embodiment, the inflatable airbag comprises three chambers, wherein the airbag has two nested chambers. The configuration of the two nested chambers can be such that the one of the two nested chambers is located within the other, such that one of the nested chambers is nested within the other nested chamber. Alternatively, the two nested chambers may not be nested with respect to each other.

Figure 4:
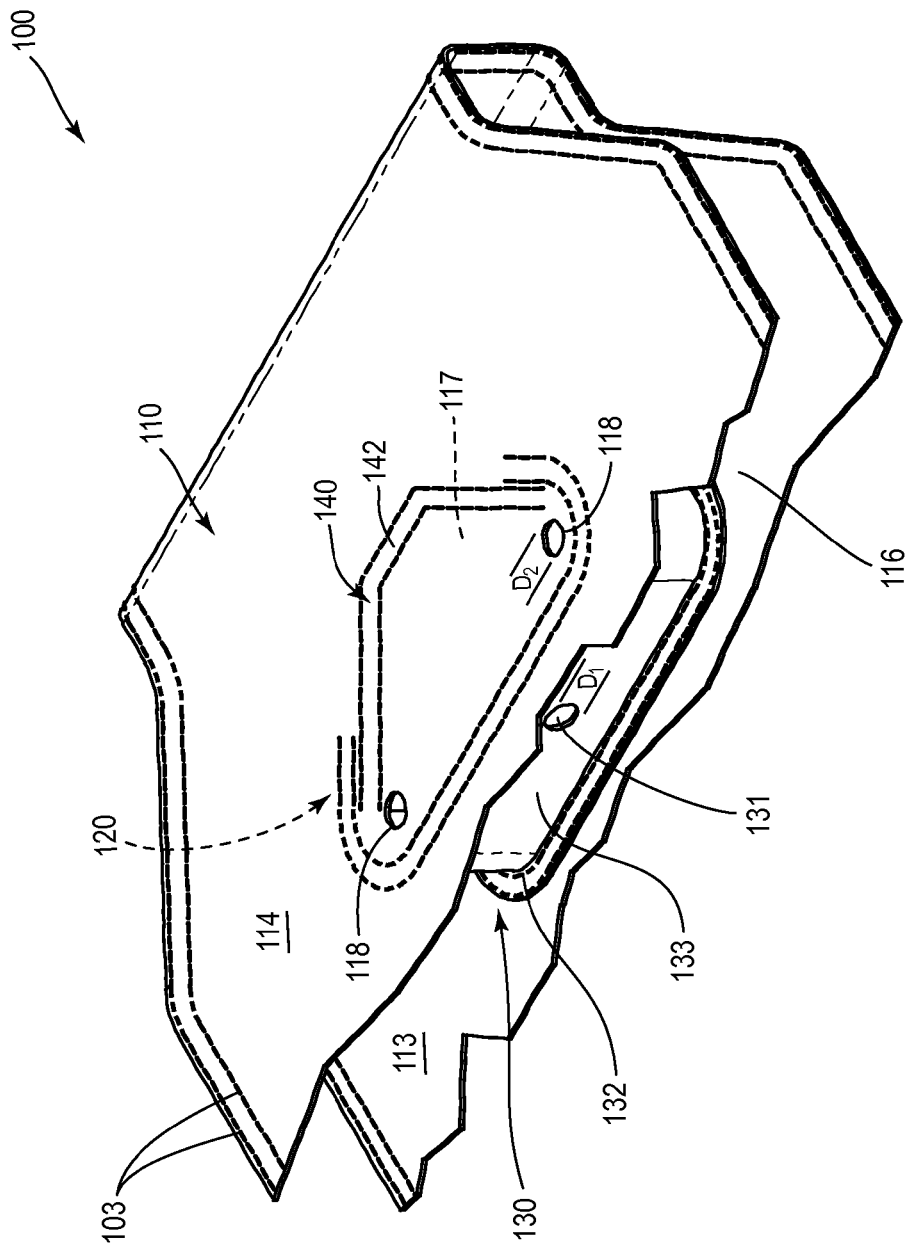
FIG. 4 is a cutaway top perspective view of the inflatable knee airbag assembly of FIG. 3.

FIG. 4 depicts a bottom perspective view of a portion of inflatable knee airbag assembly 100, wherein the upper portion of inflatable knee airbag 110 has been cutaway. Internal tether 120 is formed from first and second tether portions 130 and 140 and the tether portions are coupled to first and second faces 113 and 114 of airbag 110 via flanges 132 and 142. A chamber-to-chamber vent 131 may be formed in body portion 133 of first tether portion 130. Chamber-to-chamber vent 131 allows inflation gas to flow from first inflatable chamber 116 to second inflatable chamber 117. Therefore, in the depicted embodiment, first inflatable chamber 116 may be said to be in fluid communication with second inflatable chamber 117 and the atmosphere via vent 118.

Chamber-to-chamber vent 131 may comprise a diameter $D_1$ from about 5 mm to about 45 mm. In one embodiment, chamber-to-chamber vent 131 comprises a diameter $D_1$ of 25 mm. Atmospheric vents 118 may each comprise a diameter $D_2$ of from about 0 mm to about 50 mm. In one embodiment, atmospheric vents 118 each comprise a diameter $D_2$ of 25 mm. One skilled in the art will recognize that the diameters and shapes of the chamber-to-chamber vent and the atmospheric vents may vary from those described herein for use with different sized airbags. Further, the diameters of the vents may be varied to tune the deployment and cushioning performance of the airbag. Also, in some embodiments, only one atmospheric vent may be used. Further, in some embodiments, more than one chamber to chamber chamber-to-chamber vent may be used.

Figure 5:
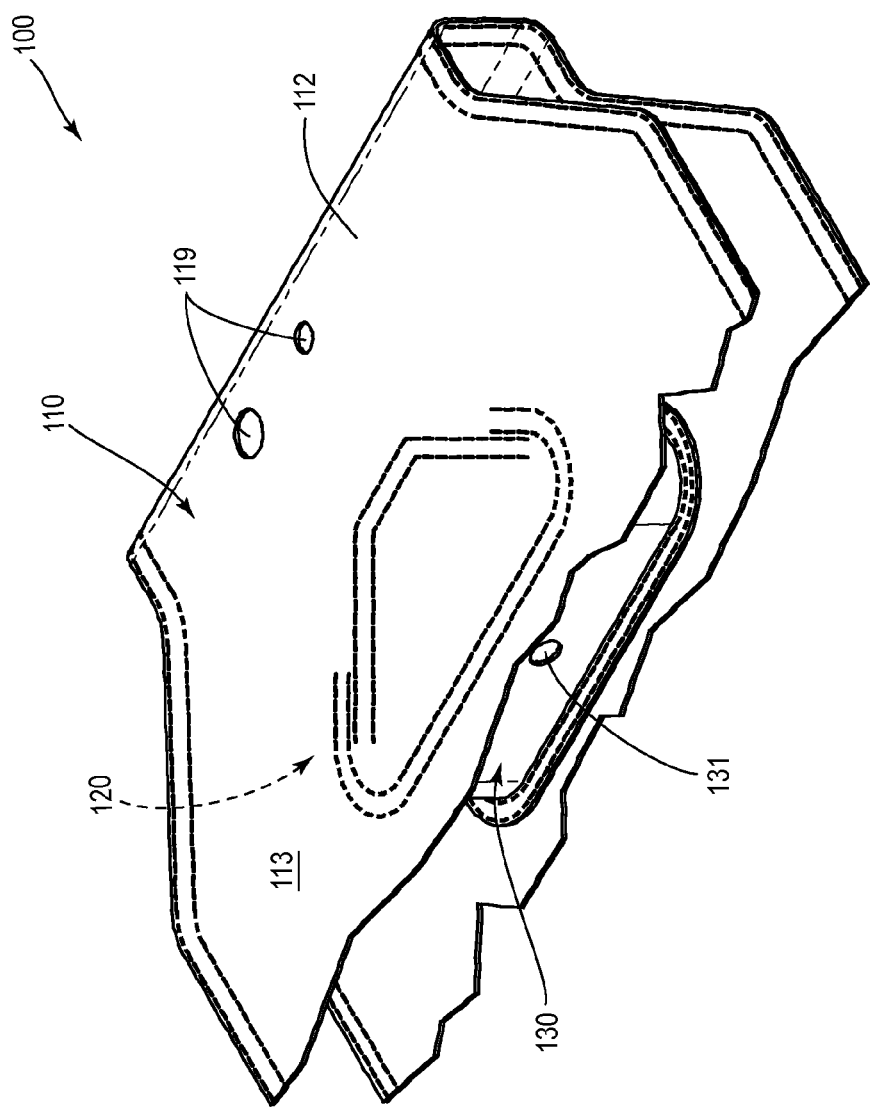
FIG. 5 is a cutaway bottom perspective view of the inflatable knee airbag assembly of FIG. 3.

FIG. 5 is a top perspective view of a portion of inflatable knee airbag assembly 110, wherein the upper portion 111 of inflatable knee airbag 110 has been cutaway. Inflator apertures 119 may be formed on lower portion 112 of airbag 110, and are configured to aid in coupling an inflator to airbag 110. In the depicted embodiment, inflator apertures are formed on first face 113. Chamber-to-chamber vent 131 is located on first tether portion 130 of tether 120. Chamber-to-chamber vent 131 is located on a side that opposes lower portion 112 and inflator apertures 119. In some embodiments, one or more layers of one or more heat resistant fabrics may be coupled near the inflator attachment area of the airbag. The heat resistant fabric may comprise a plain woven fiberous material with a silicone coating, wherein the fiberous strands in the fabric comprise E-glass, S-glass, or S2-glass grades of fiberglass. If present, the silicone coating may be applied to one side of the fabric and the fabric oriented within the airbag such that the silicone coated side faces the inflator. Additionally, the airbag may have perimeter seam reinforcements and/or reinforcement material and/or stitching at the inflator apertures.

One skilled in the art will recognize that a variety of types and configurations of heat resistant materials and coatings, as well as reinforcements may be employed without diverging from the spirit of the present disclosure. For example, the material need not be plain woven, but may have a more random fiber orientation. Also, the heat resistant material may comprise one or more of a variety of different fibers such as para-aramid synthetic fibers that are sold as Kevlar brand fibers, carbon, hemp, nylon, and polyester. Further, the heat resistant coating may comprise one or more materials such as neoprene, urethane, phenolic materials, and other flexible epoxies. In some embodiments, the reinforcement material and the heat resistant material may comprise the same material.

Figure 6:
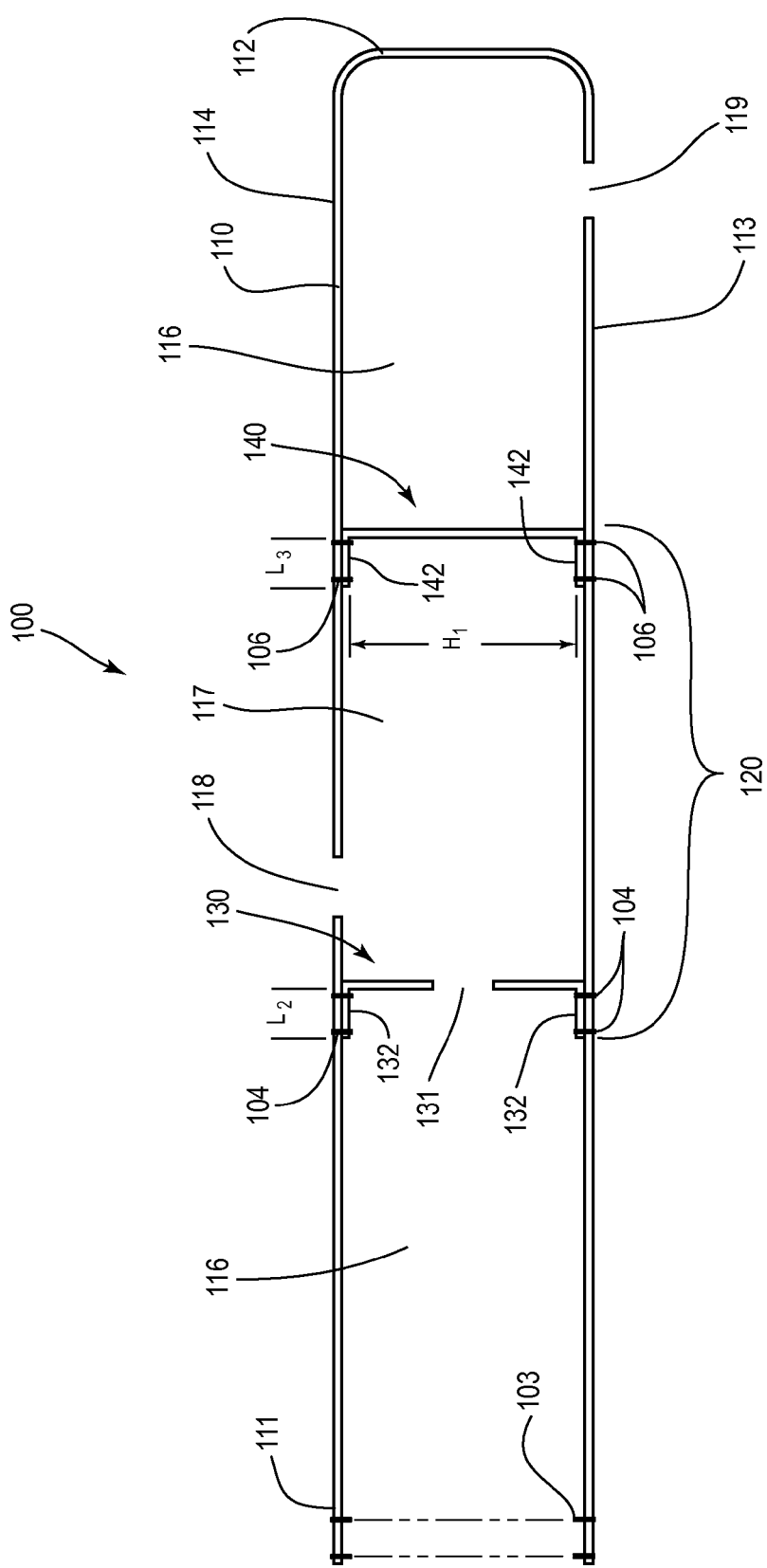
FIG. 6 is a cross-section view of the inflatable knee airbag assembly of FIG. 3.

FIG. 6 is a cross-sectional view of a portion of inflatable knee airbag assembly 100, wherein for clarity, the airbag is depicted with perimeter seam 103 in an open configuration such as in FIG. 3. As described above, airbag 103 has an upper portion 111, at which a portion of perimeter seam 103 can be seen; a lower portion 112 defining a fold; a first face 113; and a second face 114. Inflator apertures 119 are formed in lower portion 112 of first face 113. The internal tether is formed from first and second tether portions 130 and 140. A height, $H_1$ of each of the first and second tether portions 130 and 140 may be in a range from about 15 mm to about 300 mm. One skilled in the art will recognize that the height of each of the tether portions may vary from each other. Also, the heights of the tether portions may vary from embodiment to embodiment of the inflatable knee airbag assembly described herein. Also, as the heights of the tether portions partially define the height (or inflated depth) and the volume of the airbag and especially the second inflatable chamber when inflated, the height of the tether portions is a tunable feature to alter deployment and cushioning characteristics of the airbag.

Each of the tether portions 130 and 140 is coupled to the first and second faces 113 and 114 at flange portions 132 and 142. Flange portions 132 and 142 may comprise lengths $L_2$ and $L_3$, respectively, wherein $L_2$ and $L_3$ may each comprise a length in a range from about 5 mm to about 25 mm. One skilled in the art will recognize that the length of each of the flange portions may be the same for each tether portion, and that the length of the flange portions may vary along an attachment point of the flange to the airbag. The flanges 132 and 142 may be coupled to the first and second faces 113 and 114 via stitching 104 and 106.

Chamber-to-chamber aperture 131 is located on an upper portion 111 side of tether 120 such that inflation gas may flow between first inflatable chamber 116 and second inflatable chamber 117. In one embodiment, chamber-to-chamber aperture 131 may comprise a one way valve such that inflation gas may pass from first inflatable chamber 116 to second inflatable chamber 117, but not vice versa. Tether 120 forms a second inflatable chamber 117 that is defined by first and second tether portions 130 and 140 as well as the portions of first and second faces 113 and 114 that are located within the first and second tether portions. An atmospheric vent 118 may be formed in a portion of second face 114 that is located between first and second tether portions 130 and 140 such that inflation gas may be passed from second chamber 117 to outside airbag 110.

Figure 7B:
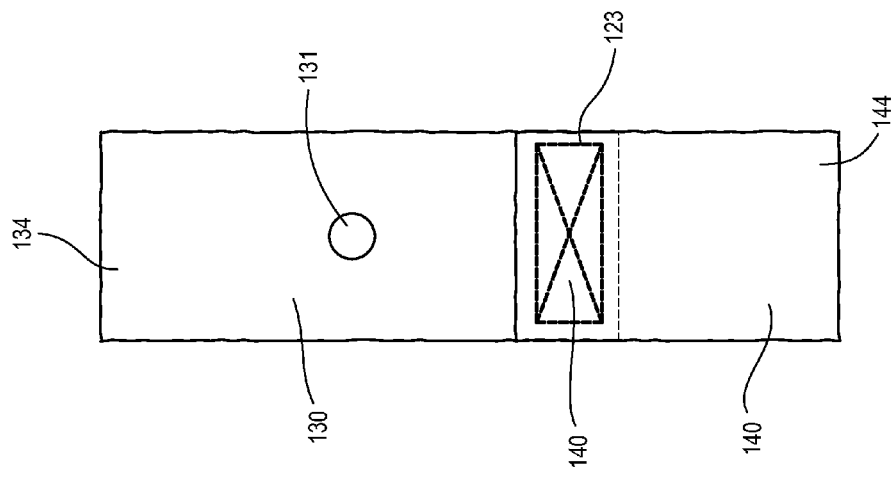
FIG. 7B is a top elevation view of the components of the internal tether of FIG. 7A, after the components have been partially assembled.
Figure 7A:
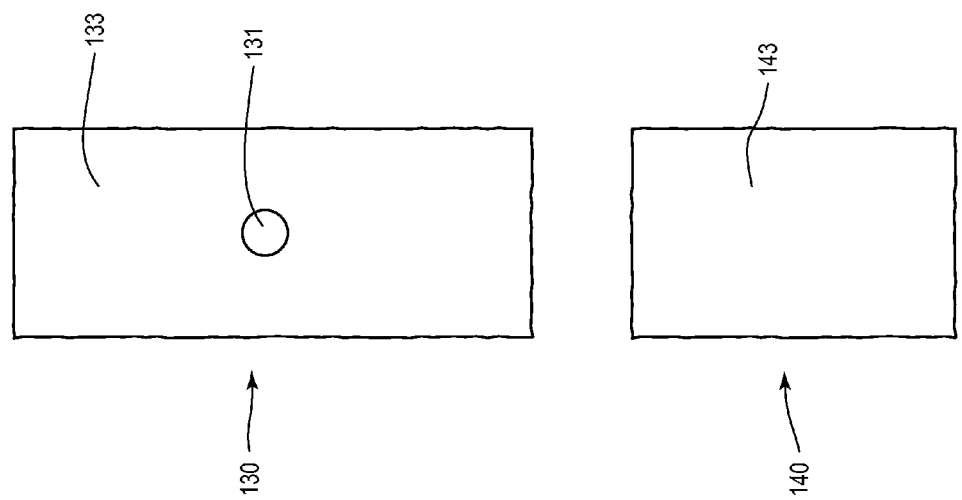
FIG. 7A is a top elevation view components of an internal tether of the inflatable knee airbag assembly of FIG. 3.

FIG. 7A depicts first and second tether portions 130 and 140 from a top elevation view. As described above, the internal tether may be formed from pieces of material cut from a panel of material from which the inflatable knee airbag can be formed. In another embodiment, the internal tether comprises a single piece of material. Each of the first and second tether portions 130 and 140 have body portions 133 and 143. The tether flanges, described herein, may be located along side portions of the tether portions. Chamber-to-chamber aperture 131 is located on first tether portion 133.

FIG. 7B depicts first and second tether portions 130 and 140 from a top elevation view after the tether portions have been coupled together via stitching 123. Tether portions 130 and 140 are coupled such that chamber-to-chamber vent 131 is not covered. Chamber-to-chamber vent 131 may be formed prior to first tether 130 portion being coupled to second tether portion 140, or vent 131 may be formed after the internal tether has been formed from first and second tether portions. In the depicted embodiment, stitching 123 is configured as a box stitch. The internal tether may continue to be formed via the free ends 134 and 144 of first and second tether portions 130 and 140 being brought adjacent each other and stitched together, as depicted in FIG. 8.

One skilled in the art will appreciate that a plurality of types, number, and configurations of tethers and tether portions may be employed without departing from the spirit of the present disclosure. For example, the internal tether may be formed from a single piece of material that is not derived from the same panel of material from which the airbag is formed, as depicted in FIG. 1, herein. The inflatable knee airbag may employ a plurality of internal tethers, which form a plurality of inflatable chambers. Further, the inflatable knee airbag may employ one or more internal tethers that do not form nested inflatable chambers.

FIG. 8 is a perspective view of internal tether 120 of assembly 110, wherein the tether is formed from first tether portion 130 and second tether portion 140 that have been coupled together at stitching 123. Body portions 133 and 143 partially define the second inflatable chamber, and the heights of the body portions partially define the inflated depth and volume of the inflatable knee airbag. Chamber-to-chamber vent 131 is formed in first tether portion 130. Internal tether 120 may be oriented within an inflatable knee airbag such that chamber-to-chamber vent 131 of first tether portion 130 is on an upper side of the internal tether and second tether portion 140 is on a lower side 122 of the internal tether. Flanges 132 and 142 are depicted in a predetermined orientation, wherein the flanges are all oriented toward upper side 121 of tether 120.

In the depicted embodiment, internal tether 120 may be said to comprise a trapezoid, such as an isosceles trapezoid, wherein upper side 121 may be called a first base, and lower side 122 may be called a second base. Upper side 121 and lower side 122 are generally parallel. In the depiction of FIG. 8, first base 121 has a greater length than second base 122. Lower side 122 of internal tether 120 is closer to an inflator than upper side 121 and lower side 122 has a smaller width than a maximum width of the internal tether 120. For example, in the depicted embodiment, lower side 122 has a smaller width than upper side 121, which defines a maximum width of internal tether 120.

In another embodiment, the internal tether may be said to comprise a substantially triangular shape, wherein its upper side appears just like upper side 121 and it has an apex instead of a lower side 122. The corners of an internal tether that has three or more sides may be sharp corners instead of the rounded corners that are depicted in FIG. 8. In an additional embodiment, the internal tether comprises a circle. In another embodiment, the internal tether comprises an oval. If the internal tether is circular or has a symmetric oval shape, then the maximum width will not be found at one of the sides, but rather at a middle portion.

Figure 9:
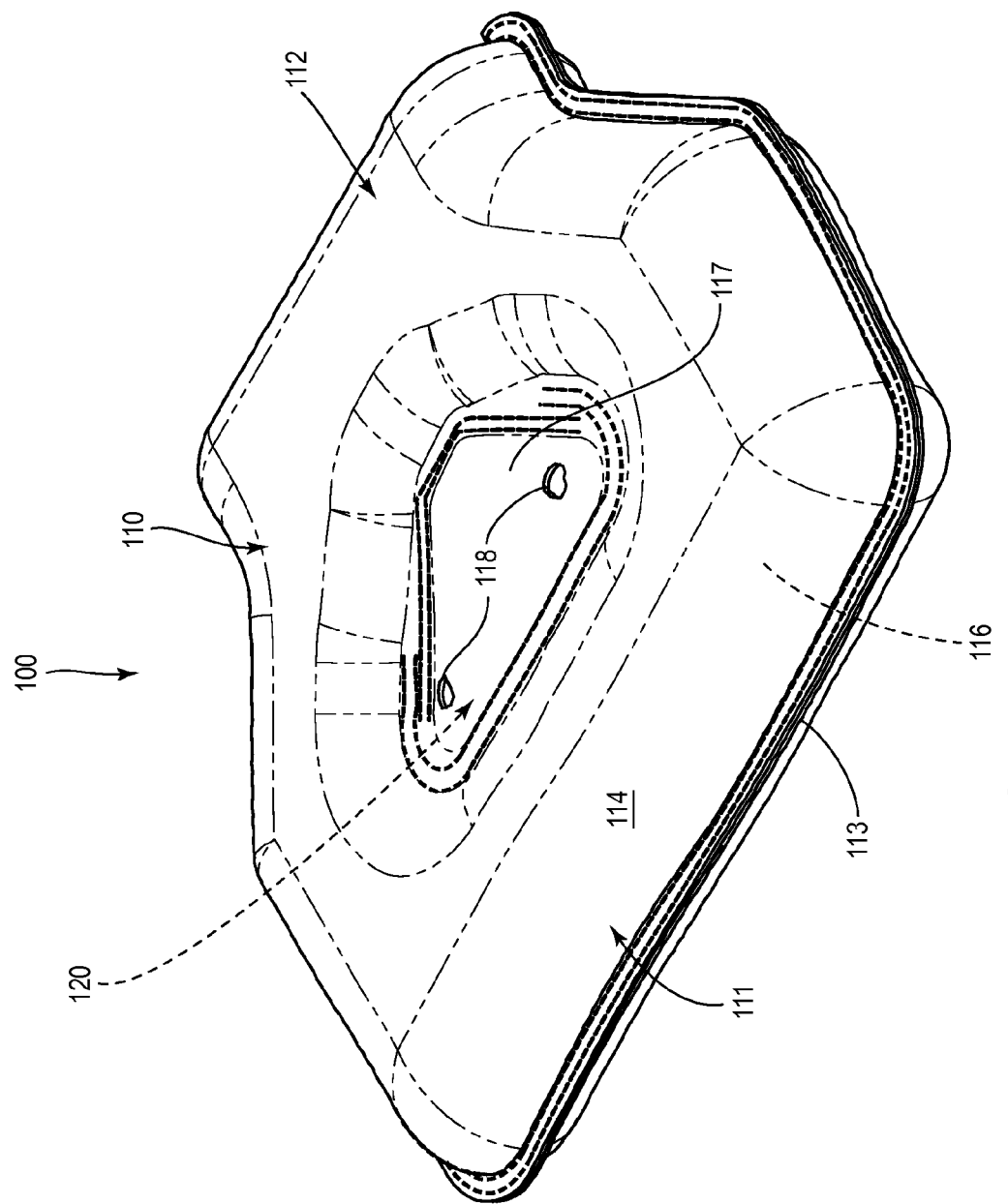
FIG. 9 is a perspective view of the inflatable knee airbag assembly of FIG. 3 after the airbag has been inflated.

FIG. 9 depicts a bottom perspective view of a portion of inflatable knee airbag assembly 100, wherein inflatable knee airbag 110 is in an inflated state. In the depiction, second face 114 is upward, first face 113 is downward, folded lower portion 112 is distal to a viewer, and upper portion 111 is proximal to the viewer. Internal tether 120 partially defines a second inflatable chamber 117 that has a reduced height or inflated depth compared to first inflatable chamber 116. Atmospheric vents 118 allow inflation gas to exit inflatable knee airbag 110.

Figure 10:
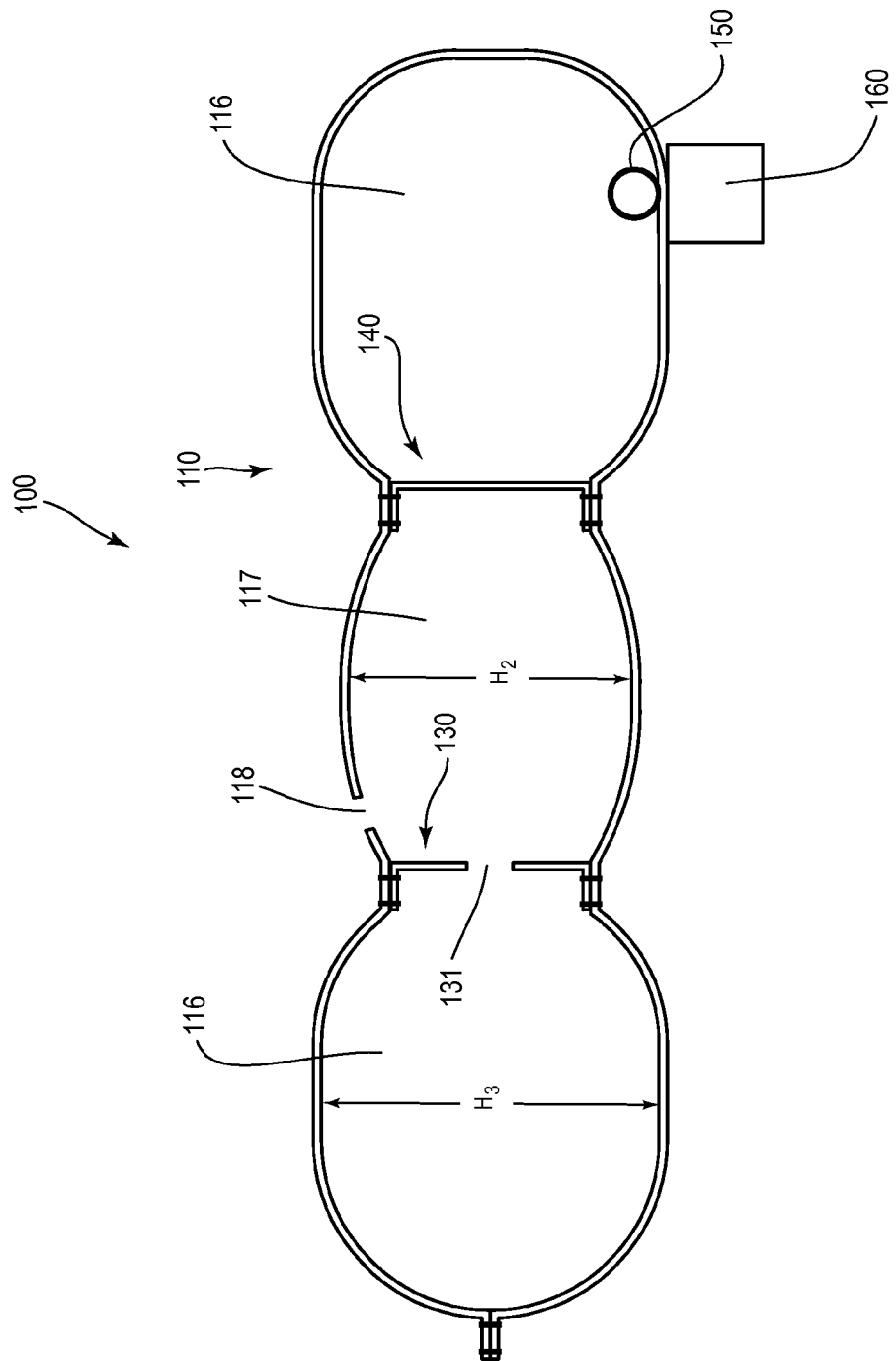
FIG. 10 is a cross-section view of the inflated knee airbag assembly of FIG. 9.

FIG. 10 is a cross-sectional view of inflatable knee airbag assembly 110, similar to FIG. 6, except in FIG. 10, airbag 110 is depicted as being inflated. Inflator 150 is coupled to airbag 110 and housing 160 via the inflator apertures (not visible). Airbag 110 comprises a first inflatable chamber 116 and a second inflatable chamber 117 that is partially defined by first and second tether portions 130 and 140. In an inflated state, airbag 110 is configured such that second inflatable chamber 117 may have an inflated height (or inflated depth) $H_2$ that is smaller than an inflated height $H_3$ of first inflatable chamber 116. As such, second inflatable chamber 117 may be described as a reduced-depth inflatable chamber. One skilled in the art will recognize that the events of deployment, inflation, and cushioning of an occupant are not static, and as such, the shape and heights of airbag 110 depicted in FIGS. 9-10 are for illustrative purposes only. Also, chamber-to-chamber aperture 131 and atmospheric vents 118 allow a total volume of inflation gas within airbag 110 and relative volume of inflation gas between the first and second inflatable chambers 116 and 117 to vary, such that the depiction of FIG. 10 may only be accurate for a short duration during airbag inflation without interaction with an occupant.

Figure 11:
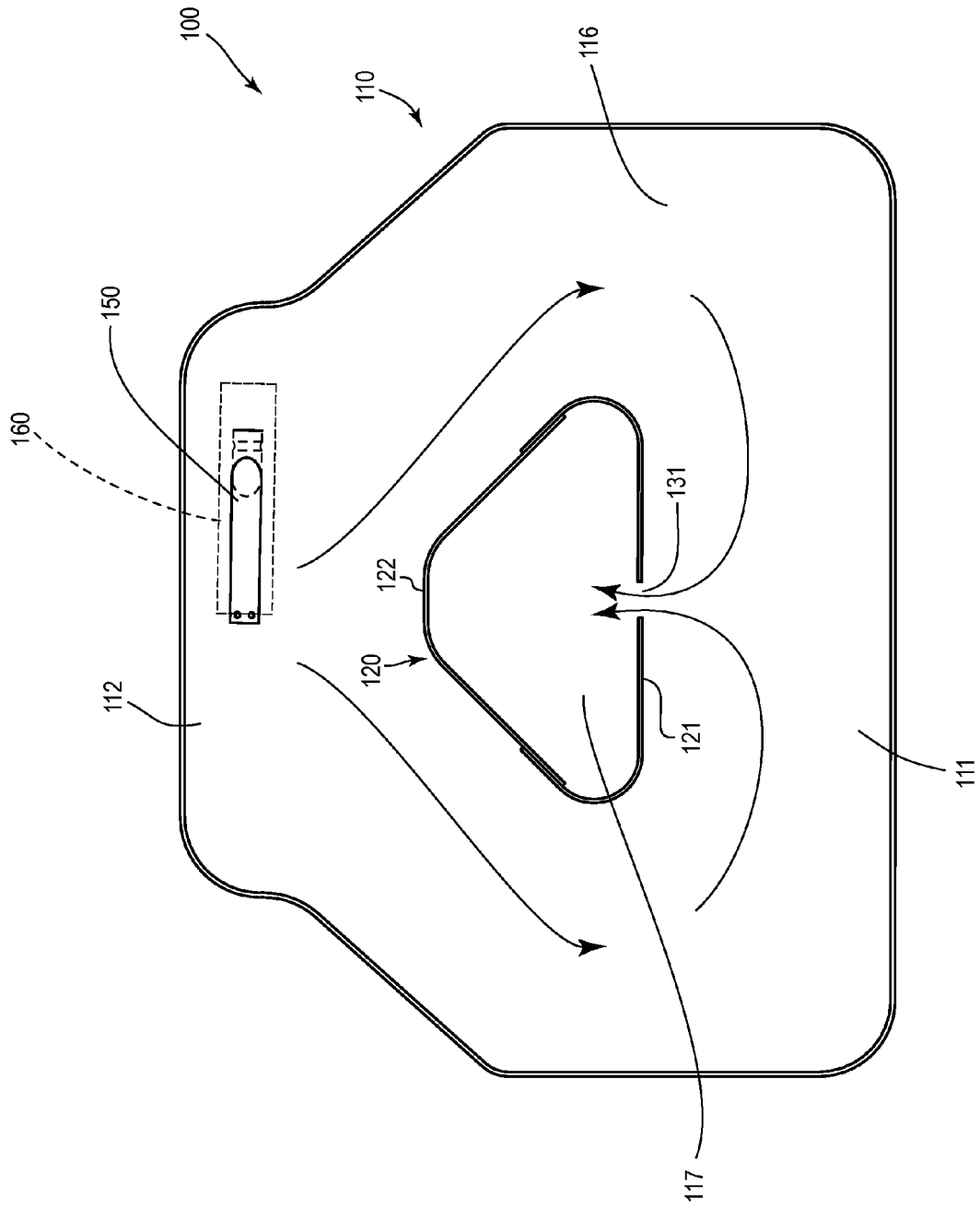
FIG. 11 is a top elevation schematic of an inflation gas flow pattern that may be dictated by the configuration of the depicted inflatable knee airbag assembly.

FIG. 11 is a top cross-sectional view of inflatable knee airbag assembly 100 that depicts an inflation gas flow pattern that is dictated by the configuration of assembly 100. In response to predetermined conditions, inflator 150 is anchored to a portion of housing 160, and may generate and/or release inflation gas, which may cause airbag 110 to change configurations from a folded and/or rolled configuration to an extended configuration. During airbag 110 deployment, inflation gas may generally travel from lower portion 112 to upper portion 111, wherein the inflation gas travels along a periphery of airbag 110 within first inflatable chamber 116. Internal tether 120 is located in a predetermined location and is in a predetermined orientation such that inflation gas travels around lower portion 122 towards upper portion 121. The inflation gas may then enter second inflation chamber 117 via chamber-to-chamber aperture 131.

One skilled in the art will recognize that a variety of shapes and configurations of tethers may be employed to form one or more nested chambers. Further, one skilled in the art will recognize that the embedded chamber need not be freestanding within the outer, or larger, chamber. In addition to being coupled to the first and second faces of the airbag, the nested inflatable chamber may share one or more side portions with the larger chamber. For example, the wider upper side of the nested chamber (at reference number 121 in FIG. 11) may be formed by the perimeter of the upper portion of the inflatable knee airbag (at reference number 111 in FIG. 11). In such an embodiment, the chamber-to-chamber vents can be relocated to side portions or the lower side of the nested chamber. In such embodiments, the gas flow pattern depicted in FIG. 11 may be altered.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 ¶6. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An inflatable knee airbag comprising:

an airbag cushion comprising a front face and a rear face that meet at an outer perimeter of the airbag cushion, and further comprising a plurality of inflatable chambers, wherein an outer inflatable chamber is at least partially defined by an outer portion of the front face and an outer portion of the rear face, and wherein a nested inflatable chamber is at least partially defined by an inner portion of the front face and an inner portion of the rear face and is nested within the outer inflatable chamber such that an entirety of an outer perimeter of the nested inflatable chamber is spaced from the outer perimeter of the airbag cushion, wherein the airbag cushion has opposing sides, an upper portion and a lower portion, wherein the nested inflatable chamber is partially defined by an internal tether, wherein the nested inflatable chamber has a chamber-to-chamber vent in the internal tether that permits inflation gas to directly enter the nested inflation chamber from the outer inflatable chamber, and wherein during inflation, the airbag cushion is configured to receive inflation gas from an inflator at the lower portion and the nested inflatable chamber is positioned to split the inflation gas such that the inflation gas travels in two paths in the outer inflatable chamber by moving around the nested inflatable chamber toward the opposing sides of the airbag cushion from the lower portion to the upper portion to partially inflate the outer inflatable chamber before the inflation gas enters the nested inflatable chamber via the chamber-to- chamber vent, and the front face of the airbag cushion is directed toward the position of a vehicle occupant.

2. The inflatable knee airbag of claim 1, wherein the chamber-to-chamber vent is located on an upper side of the nested inflatable chamber.

3. The inflatable knee airbag of claim 1, wherein the nested inflatable chamber has three sides that each have a length that is significantly greater than the diameter of the chamber-to-chamber vent.

4. The inflatable knee airbag of claim 1, wherein the internal tether limits an inflatable depth of the nested inflatable chamber such that the nested inflatable chamber has a reduced inflatable depth compared to the outer chamber.

5. The inflatable knee airbag of claim 1, wherein the nested inflatable chamber comprises an atmospheric vent that is configured such that inflation gas may exit to outside the inflatable knee airbag only via the nested inflatable chamber.

6. The inflatable knee airbag of claim 1, wherein the internal tether comprises a triangular shape.

7. The inflatable knee airbag of claim 1, wherein the internal tether comprises a trapezoidal shape.

8. The inflatable knee airbag of claim 7, wherein the internal tether comprises an isosceles trapezoidal shape.

9. An inflatable knee airbag comprising:

an airbag cushion comprising opposing sides, an upper portion and a lower portion, an outer inflatable chamber and a nested inflatable chamber that is nested within the outer inflatable chamber, wherein the outer inflatable chamber is partially defined by an outer portion of a first face and an outer portion of a second face that are coupled together along a perimeter, wherein the nested inflatable chamber is defined by an internal tether that is coupled to both of the first and second faces, an inner portion of the first face that is encompassed by the outer portion of the first face, and an inner portion of the second face that is encompassed by the outer portion of the second face, wherein the internal tether comprises a chamber-to-chamber vent that is configured such that inflation gas may travel directly from the outer inflatable chamber to the nested inflatable chamber, wherein the nested inflatable chamber comprises an atmospheric vent that is configured such that inflation gas may exit the nested inflatable chamber to outside the inflatable knee airbag, wherein during inflation, the airbag cushion is configured to receive inflation gas from an inflator at the lower portion and the nested inflatable chamber is positioned to split the inflation gas such that the inflation gas travels in two paths in the outer inflatable chamber by moving around the nested inflatable chamber toward the opposing sides of the airbag cushion from the lower portion to the upper portion to partially inflate the outer inflatable chamber before the inflation gas enters the nested inflatable chamber via the chamber-to-chamber vent, and wherein during inflation of the airbag cushion, the first face is directed toward the position of an occupant and the second face is directed away from the position of an occupant, and wherein the outer inflatable chamber inflates to a greater height than the nested inflatable chamber such that the outer portion of the front face inflates to a greater height than does the inner portion of the front face.

10. The inflatable knee airbag of claim 9, wherein the internal tether comprises a first tether portion and a second tether portion that are coupled together.

11. The inflatable knee airbag of claim 10, wherein the first tether portion of the internal tether comprises the chamber-to-chamber vent.

12. The inflatable knee airbag of claim 9, wherein the chamber-to-chamber vent is located on an upper side of the internal tether at the upper portion of the airbag cushion.

13. The inflatable knee airbag of claim 12, wherein the internal tether further comprises a lower side that has a smaller width than the upper side and is parallel to the upper side.

14. The inflatable knee airbag of claim 12, wherein the airbag is configured such that during inflation the inflation gas travels around the nested inflatable chamber and the chamber-to-chamber vent is the only opening into the nested inflatable chamber from the outer inflatable chamber.

15. The inflatable knee airbag of claim 9, wherein the internal tether comprises a first flange and a second flange, and wherein the first flange is attached to the first face of the inflatable knee airbag and the second flange is attached to the second face.

16. The inflatable knee airbag of claim 9, wherein the atmospheric vent is located on the second face.

17. The inflatable knee airbag of claim 9, wherein the airbag comprises a folded portion that comprises an inflator attachment portion.

18. The inflatable knee airbag of claim 9, wherein the internal tether has a trapezoidal shape.

19. The inflatable knee airbag of claim 18, wherein the internal tether has an isosceles trapezoidal shape.

* * * * *